(12) United States Patent
Lee (10) Patent No.: US 7,086,667 B2
(45) Date of Patent: Aug. 8, 2006

(54) COLORING BOOK FOR CHILDREN

(76) Inventor: Won Ku Lee, B-1103 Sungho Apt. #709 Yeoksam-dong, Kangnam-gu, Seoul (KR)

( * ) Notice: Subject to any disclaimer, the term of this patent is extended or adjusted under 35 U.S.C. 154(b) by 633 days.

(21) Appl. No.: 10/036,934

(22) Filed: Nov. 13, 2001

(65) Prior Publication Data
US 2002/0149194 A1    Oct. 17, 2002

(30) Foreign Application Priority Data
Nov. 13, 2000  (KR)  ............... 2000-67228
Feb. 7, 2001   (KR)  ............... 2001-5925

(51) Int. Cl.
*B42D 15/00* (2006.01)

(52) U.S. Cl. .............. 283/109; 281/15.1; 446/149; 40/743

(58) Field of Classification Search ............... 281/15.1, 281/22, 51, 38; 428/40.1; 283/109, 117, 283/63.1, 72; 434/81, 84, 85; 446/149; 40/124.06, 124.11, 743, 539, 124.04, 124.02, 40/124.09, 124.14; 206/232; 229/71, 304; 353/DIG. 5
See application file for complete search history.

(56) References Cited
U.S. PATENT DOCUMENTS

| | | | | |
|---|---|---|---|---|
| 1,028,921 A | * | 6/1912 | Wagner | ............... 283/63.1 |
| 1,419,882 A | * | 6/1922 | Nicholas | ............... 434/85 |
| 2,489,240 A | * | 11/1949 | Meyer | ............... 446/147 |
| 2,799,391 A | * | 7/1957 | Eisner | ............... 206/232 |
| 3,207,301 A | * | 9/1965 | Sparks | ............... 206/232 |
| 3,492,743 A | * | 2/1970 | Schmidt | ............... 434/88 |
| 4,200,222 A | * | 4/1980 | Feuer | ............... 229/92.8 |
| 5,022,682 A | * | 6/1991 | Desmond | ............... 281/38 |
| 5,031,935 A | * | 7/1991 | D'Andrea | ............... 281/15.1 |
| 5,038,930 A | * | 8/1991 | Holtkamp, Jr. | ............... 206/232 |
| 5,704,543 A | * | 1/1998 | Pollanen | ............... 229/303 |
| 5,947,522 A | * | 9/1999 | Boehm | ............... 281/22 |
| 5,951,298 A | * | 9/1999 | Werzberger | ............... 434/178 |
| 5,989,033 A | * | 11/1999 | Burgio | ............... 434/88 |
| 6,050,604 A | | 4/2000 | Ossiatzky | |
| 6,594,927 B1 | * | 7/2003 | Witkowski | ............... 40/310 |
| 2004/0012190 A1 | * | 1/2004 | D'Andrea | ............... 281/38 |

\* cited by examiner

*Primary Examiner*—Boyer D. Ashley
*Assistant Examiner*—J Williams
(74) *Attorney, Agent, or Firm*—Greenblum & Bernstein, P.L.C.

(57) ABSTRACT

A coloring book for children including a plurality of page sets bound or stapled wherein a page set includes a pair of background sheets, each having a different background design, and a sharing page placed between the background sheets having basic designs on a front and rear surface thereof so as to be coordinated with the background designs when folded with each of the background sheets.

2 Claims, 13 Drawing Sheets

COLORING BOOK FOR CHILDREN

BACKGROUND OF THE INVENTION (a) Field of the Invention

The present invention relates to an educational utility, and in particular, to a coloring book for helping develop child's image recognition, imagination, and creativity.

(b) Description of the Related Art

Baby's scribbles may be his/her first art activity and has an important meaning as his/her first visual outcome though it is not the result of any intension. The scribbles develop into meaningful drawings such as different lines and figures as the baby grows up. Further, the baby expands visual experience and objectively recognizes objects by self-learning in this way.

Accordingly, parents should help the baby to continuously get interests in the recognition and expression activities so as to develop them into fine motor skills, creativity, and image recognition.

A coloring book is considered as an educational utility so as to provide amusement while at the same time provides the means for children to become acquainted with the objects or images to be colored.

However, a conventional coloring book for children is just formed of a plurality of sheets each having outline images designed for coloring on the face of the sheet such that the coloring book may not foster the children's interests and is likely to help develop few creativity and image recognition.

SUMMARY OF THE INVENTION

The present invention has been made in an effort to solve the above problems of the prior art.

It is an object of the present invention to provide an improved coloring book for children capable of helping develop children's imagination, creativity, and image recognition through association of ideas.

To achieve the above object, a coloring book according to the present invention has a plurality of page sets bound or stapled. A page set of the coloring book comprises a pair of background sheets, each having different background design, and a sharing page putted in between the background sheets and having basic designs on a front and rear surface thereof so as to be coordinated with the background designs when folded with each of the background sheets.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENTS

Preferred embodiments of the present invention will be described hereinafter with reference to the accompanying drawings.

The coloring book comprises a plurality of page sets each being formed with a pair of background sheets and a sharing sheet and the page sets are bounded or stapled together to form a coloring book.

Figure 1:
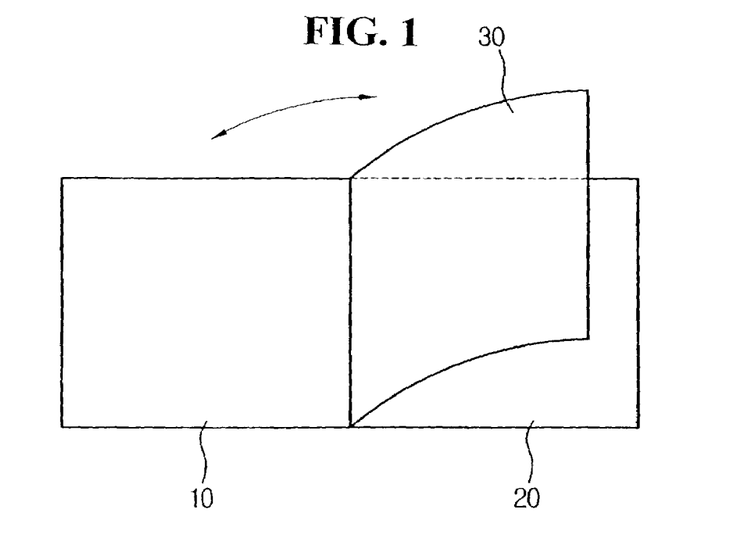
FIG. 1 is a perspective view showing a coloring book according to the present invention.

FIG. 1 is a perspective view showing a coloring book according to the present invention.

As shown in FIG. 1, the page set comprises a pair of background sheets 10 and 20 and a sharing sheet 30 in between the background sheets 10 and 20.

The sharing sheet 30 can be formed with a transparent, semitransparent, or opaque paper having various openings so as to be coordinated with the both background sheets 10 and 20.

FIG. 2 shows drawings for illustrating the coloring book according to a first embodiment of the present invention.

Figure 2A:
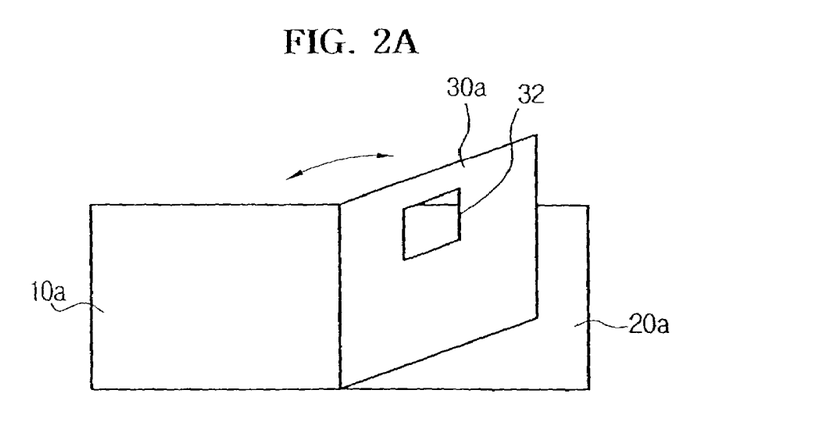
FIG. 2 shows drawings for illustrating the coloring book according to a first embodiment of the present invention.
Figure 2B:
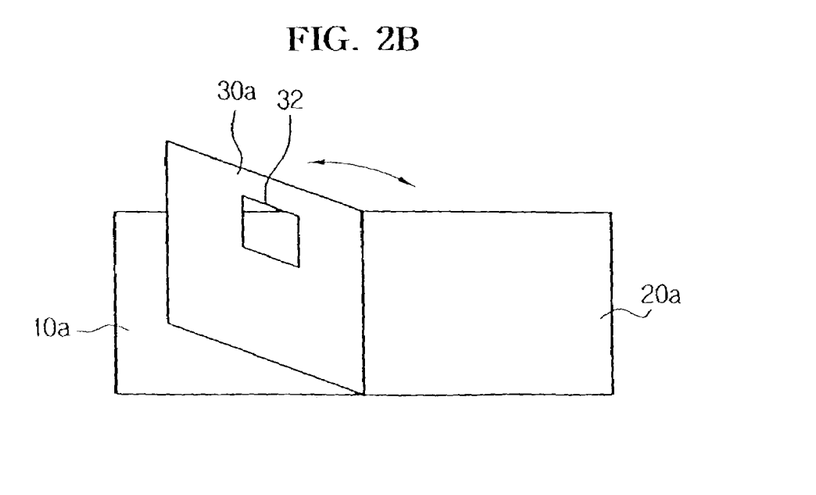

As shown in FIG. 2a and FIG. 2b, the sharing page 30a is provided with a square opening 32 so as to be coordinated with the background sheets 10a and 20a.

The operation of the coloring book according to the first embodiment of the present invention will now be described with reference to FIG. 3a~FIG. 3f.

Figure 3A:
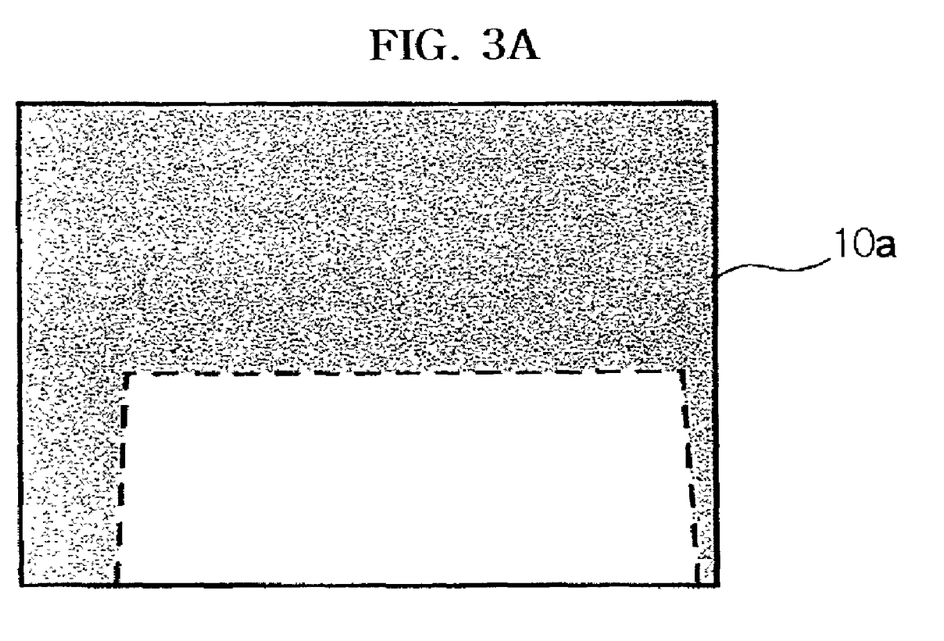
FIG. 3 shows exemplary drawings for illustrating the operation of the coloring book of FIG. 2.
Figure 3B:
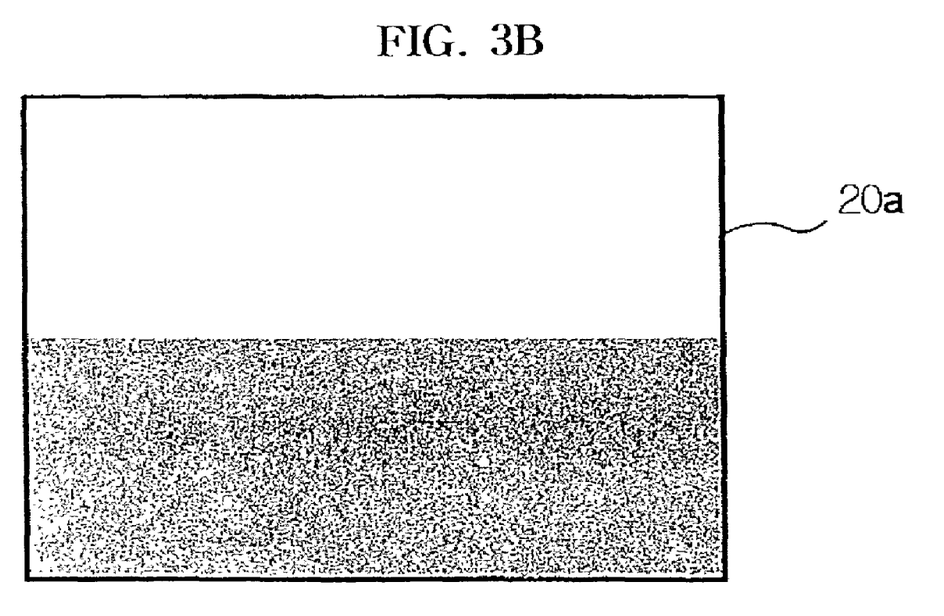
Figure 3C:
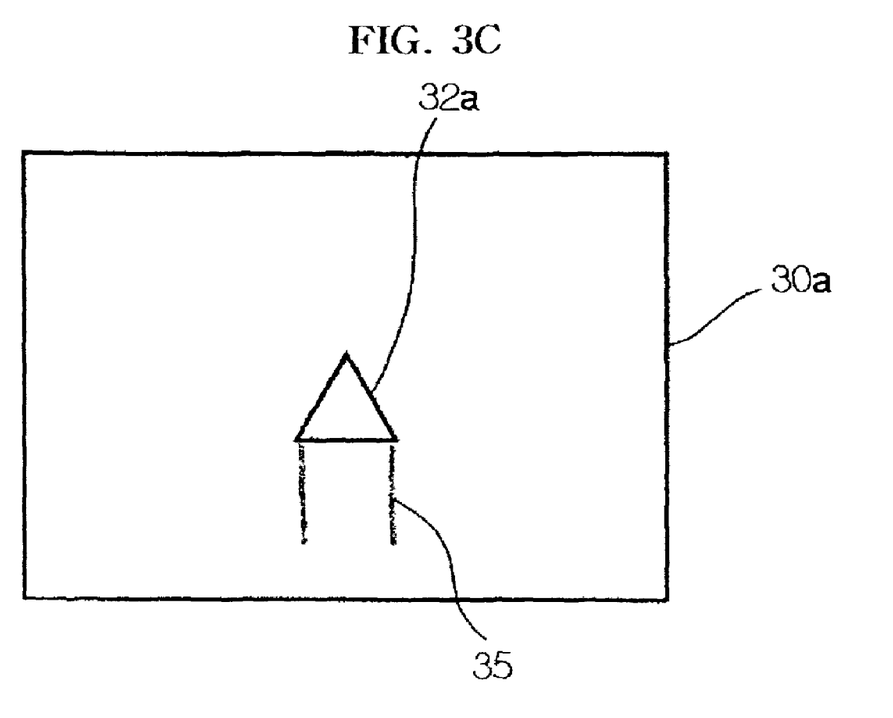
Figure 3D:
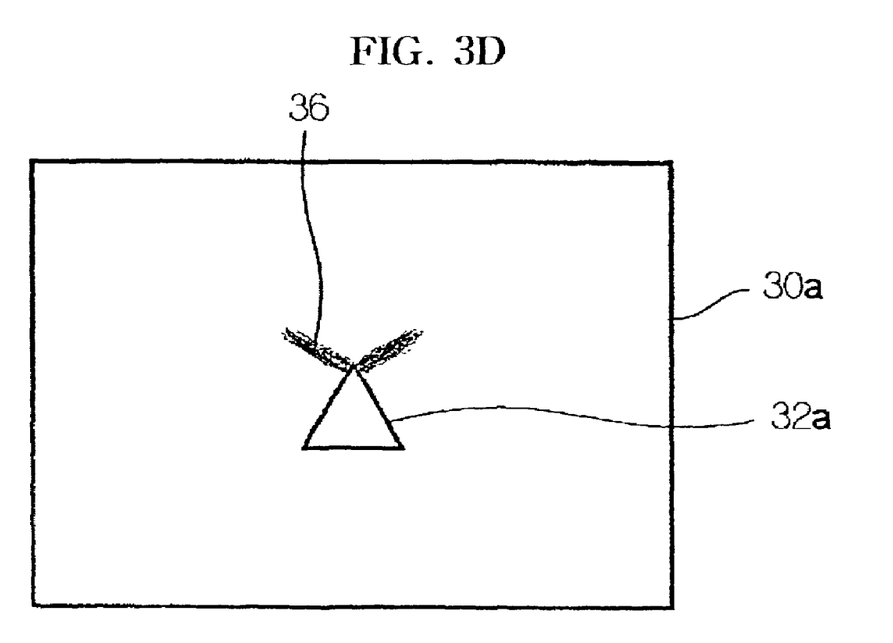

FIG. 3a and FIG. 3b show respective first and second background sheets 10a and 20a having background designs drawn thereon, and FIG. 3c and FIG. 3d show respective front and rear surfaces of the sharing sheet 30a provided with a triangle opening 32a and foreground designs 35 and 36.

Figure 3E:
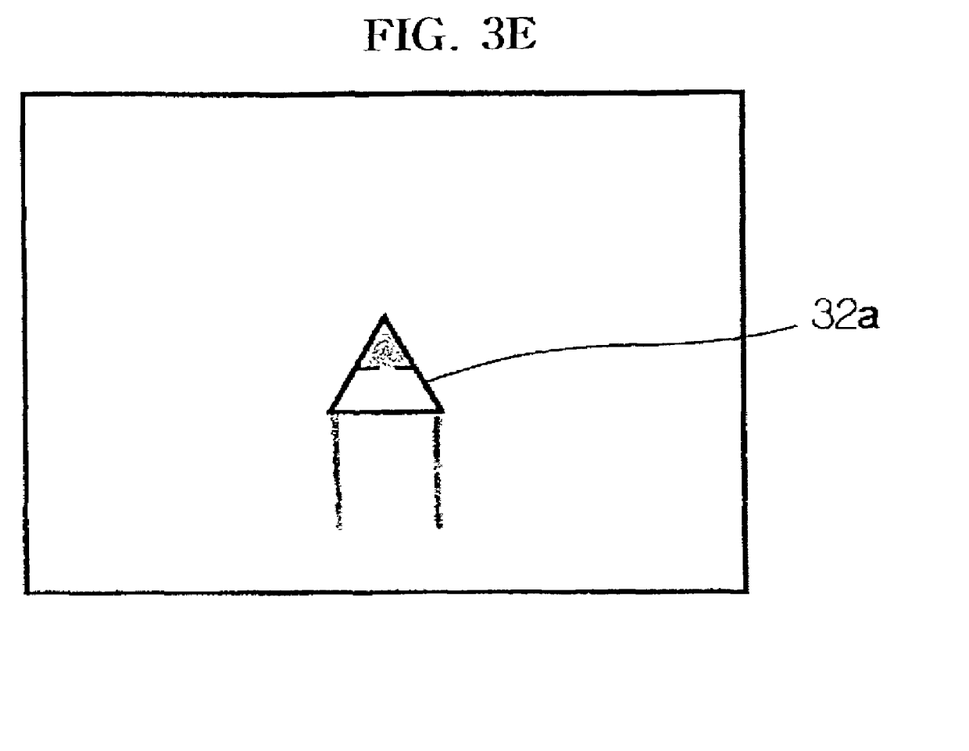

FIG. 3e shows coordinated design when the foreground design 35 on the front surface of the sharing sheet 30a is coordinated with the background design on the first background sheet 10a by folding the sharing sheet 30a with the first background sheet 10a.

Figure 3F:
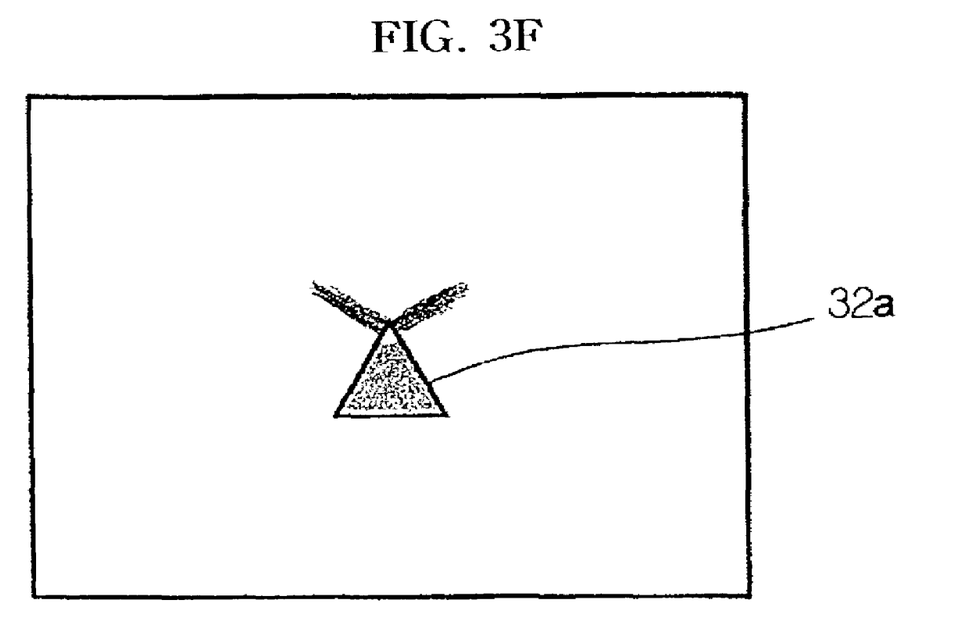

FIG. 3f shows coordinated design when the foreground design 36 on the rear surface of the sharing sheet 30a is coordinated with the background design on the second background sheet 20a by folding the sharing sheet 30a with the second background sheet 20a.

As shown in FIG. 3e and FIG. 3f, the sharing sheet 30a is provided with different designs coordinated with the triangle opening 32a on the respective front and rear surfaces thereof such that the coordinated design becomes different which background sheet is folded with the sharing sheet 30a.

Also, it is possible to use same design for front and rear surface of the sharing sheet 30a as the background designs on the first and second background designs 10a and 20a differ from each other.

Figure 4:
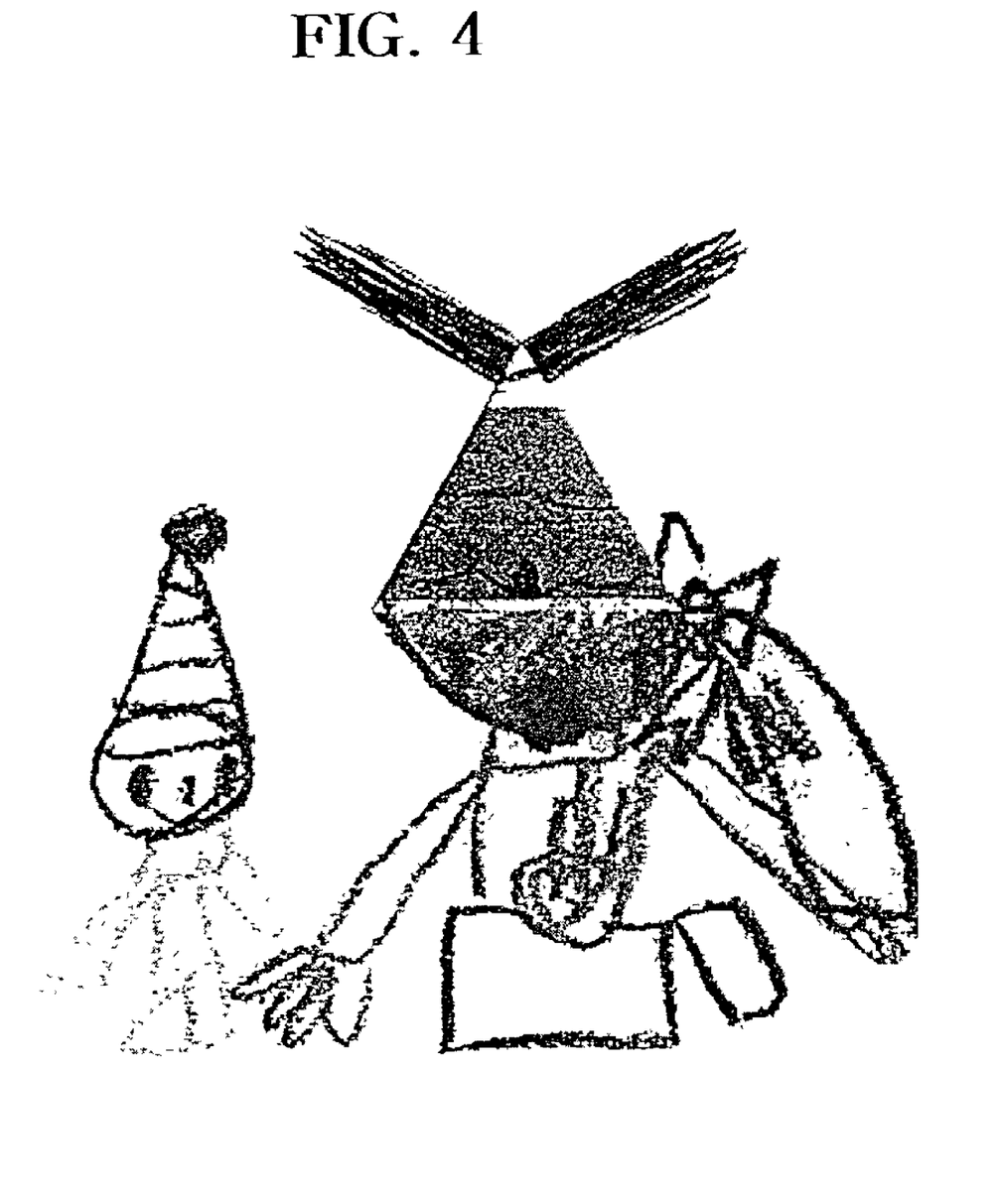
FIG. 4 is an exemplary drawing drawn on the basis of the coordinated design of FIG. 3f formed by folding the background sheet and the sharing sheet of FIG. 3

FIG. 4 is an exemplary drawing drawn by a baby on the basis of the coordinated design of FIG. 3f formed by folding the second background sheet 20a of FIG. 3b with the sharing sheet 30a of FIG. 3d. It is appear that the coordinated design of FIG. 3f suggests a peaked hat wearing on the birth day to the baby.

FIG. 5 shows drawings for illustrating the coloring book according to a second embodiment of the present invention.

Figure 5A:
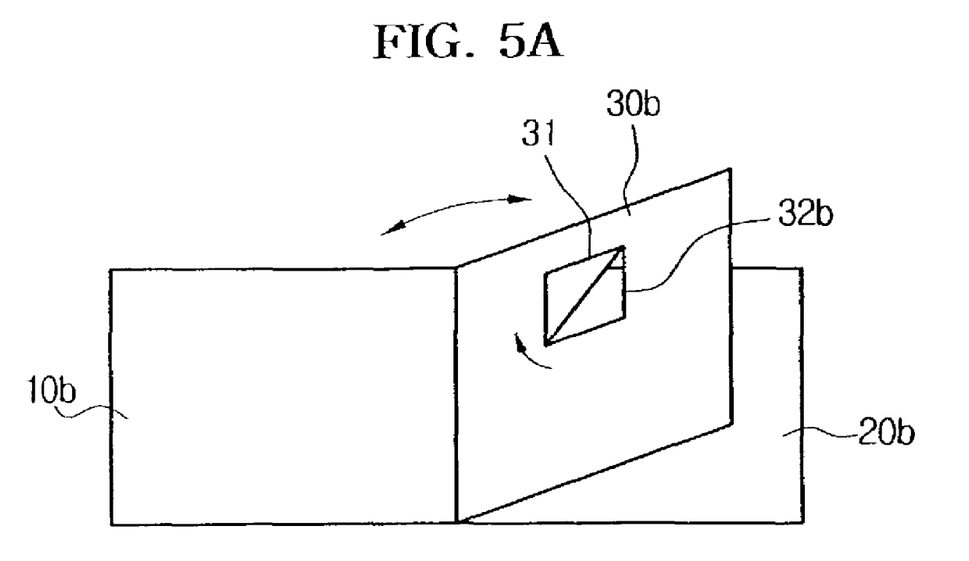
FIG. 5 shows drawings for illustrating the coloring book according to a second embodiment of the present invention.
Figure 5B:
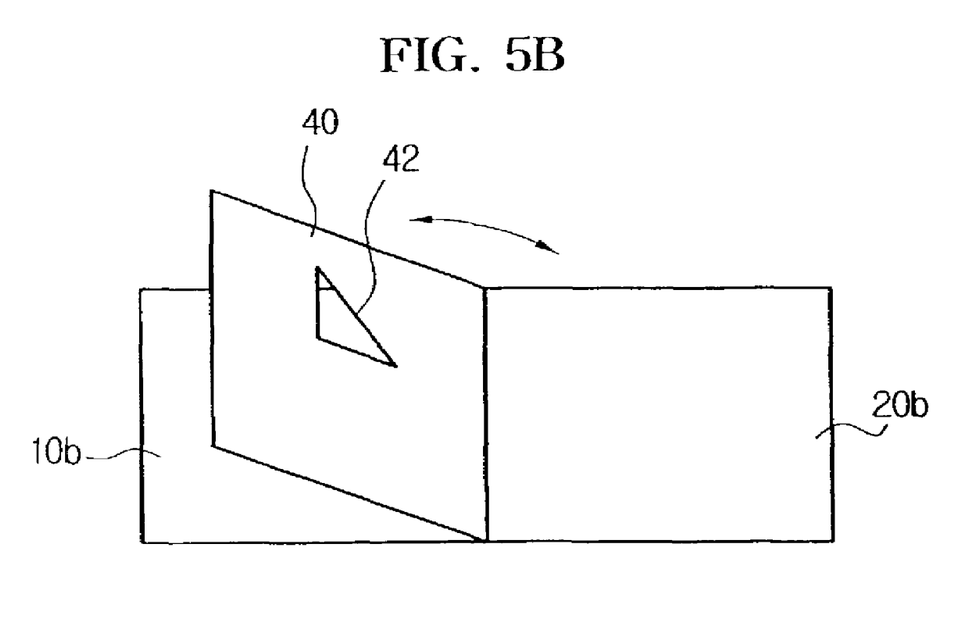

As shown in FIG. 5a and FIG. 5b, the sharing page 30b is provided with a triangle opening 32b and door 31 formed by cutting 2 sides of a triangle drawn on the sharing sheet 30b such that a triangle opening 32b can be opened and closed by the door 31.

The operation of the coloring book according to the second embodiment of the present invention will now be described with reference to FIG. 6a~FIG. 6f.

Figure 6A:
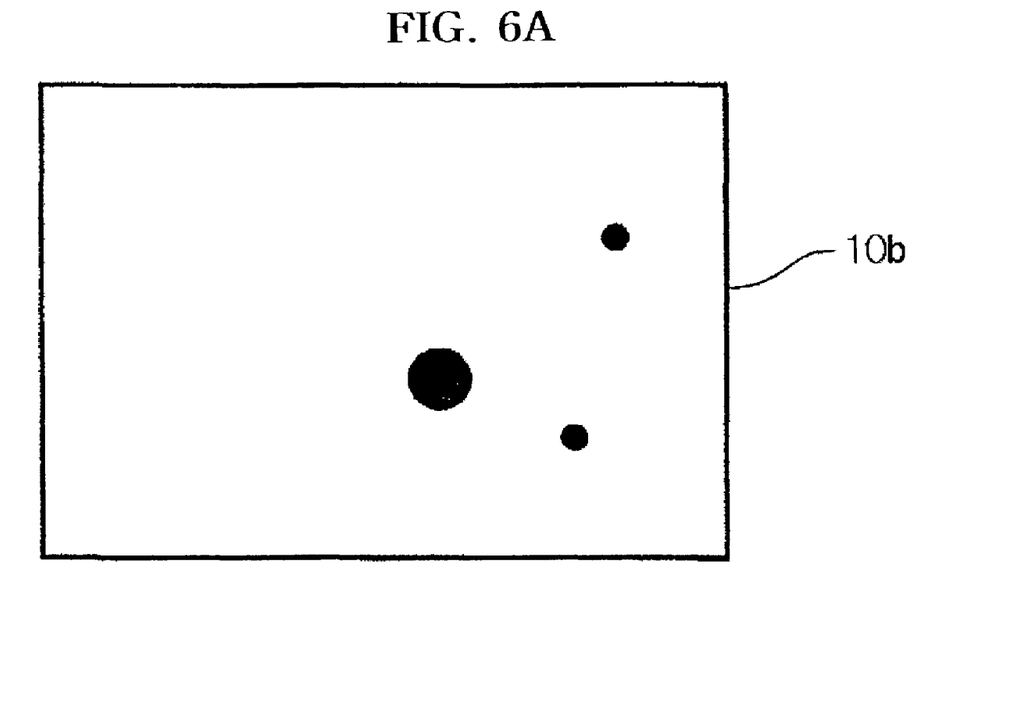
FIG. 6 shows exemplary drawings for illustrating the operation of the coloring book of FIG. 5.
Figure 6B:
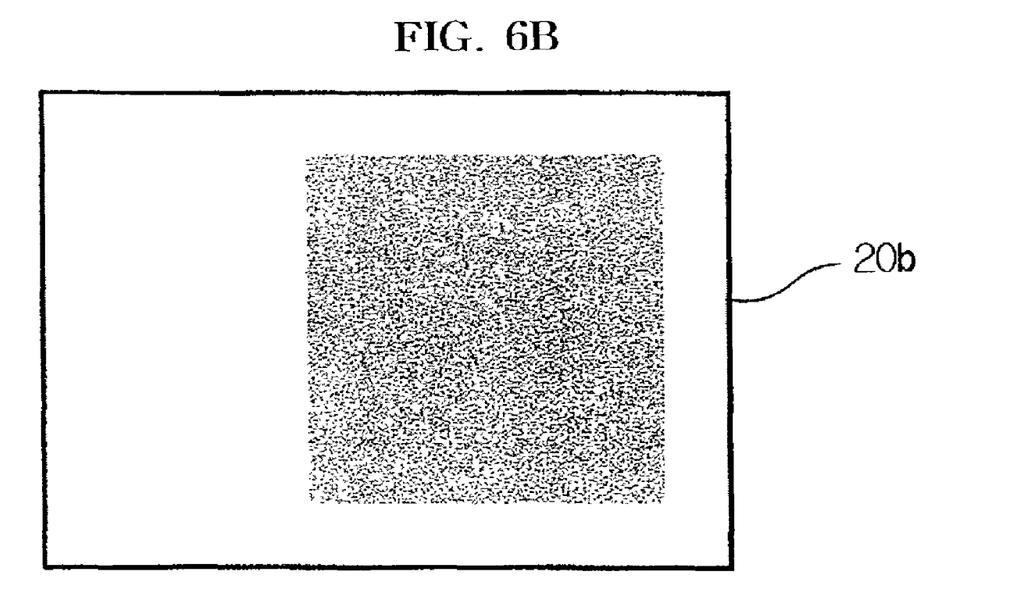
Figure 6C:
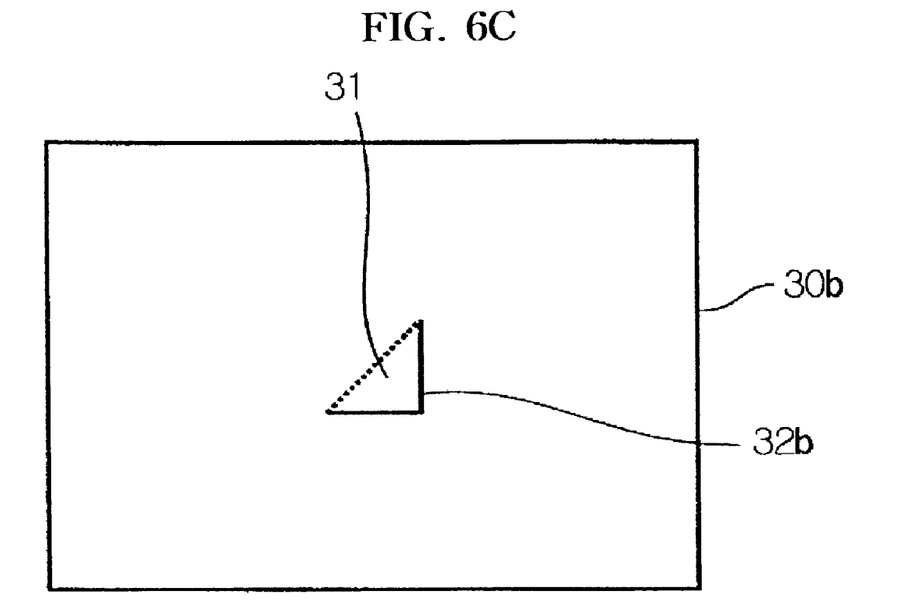
Figure 6D:
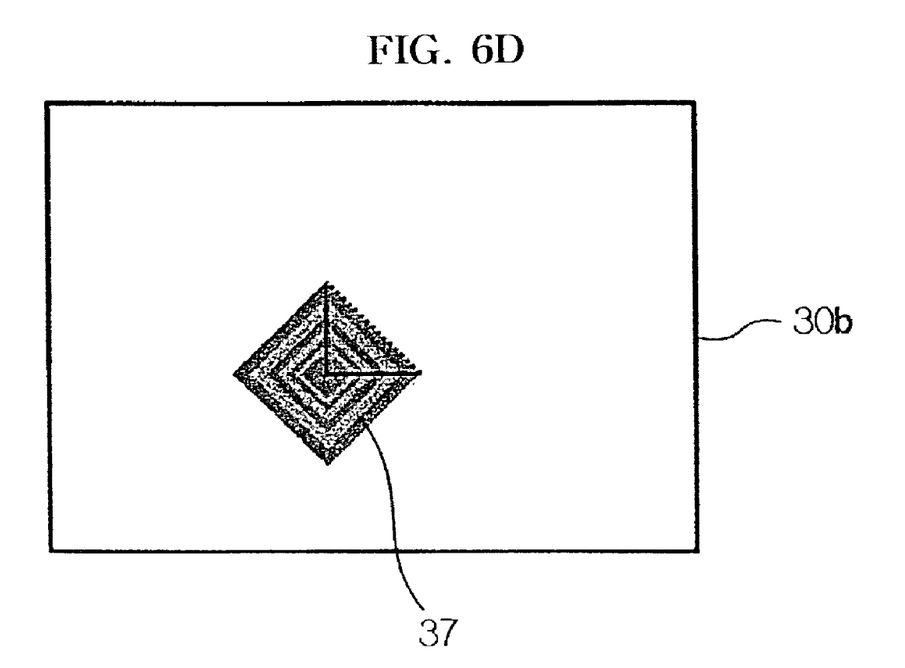

FIG. 6a and FIG. 6b show respective first and second background sheets 10b and 20b having background designs drawn thereon, and FIG. 6c and FIG. 6d show respective front and rear surfaces of the sharing sheet 30b provided with the triangle opening 32b and door 31 and foreground design 37 on the rear surface.

Figure 6E:
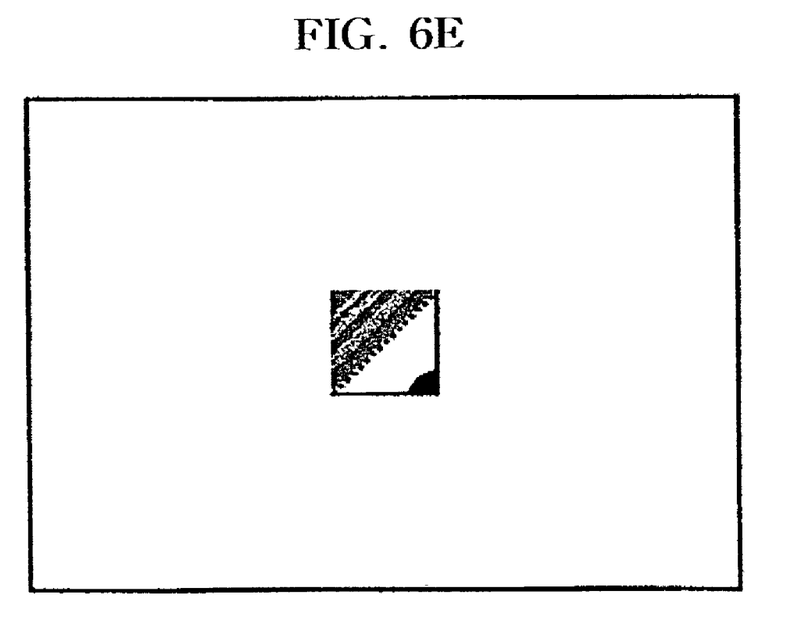

FIG. 6e shows a coordinated design when a part of the foreground design 37 on the rear surface of the sharing sheet 30b is coordinated with the background design on the first background sheet 10b by folding the sharing sheet 30b with the first background sheet 10b and folding up the door 31 of the sharing sheet 30b.

Figure 6F:
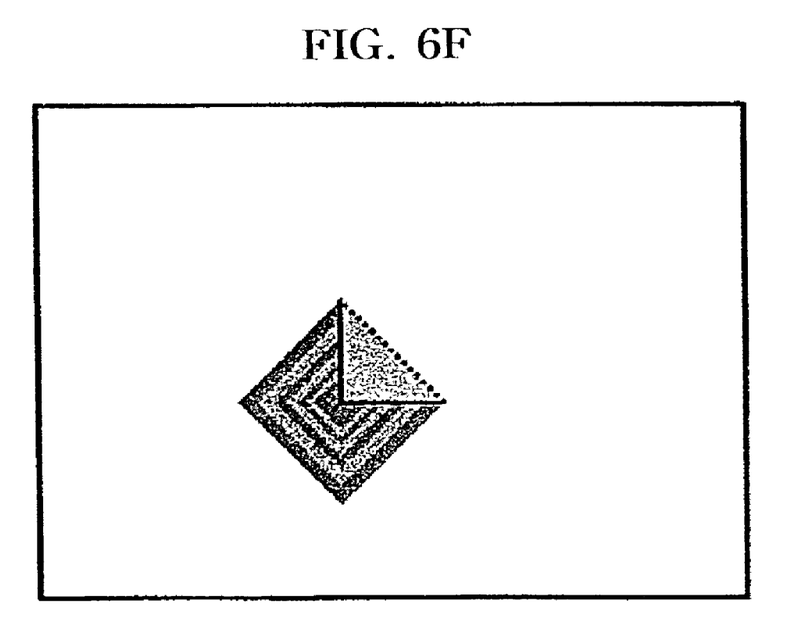

FIG. 6f shows a coordinated design when the foreground design 37 on the rear surface of the sharing sheet 30b is coordinated with the background design on the second background sheet 20b by folding the sharing sheet 30b with the second background sheet 20b in the state of the door 31 being opened.

As shown in FIG. 6e and FIG. 6f, the sharing sheet 30b is provided with the foreground design 37 which can be coordinated with the background designs on the respective first and second background sheets according to whether the door 31 is opened or closed.

Figure 6G:
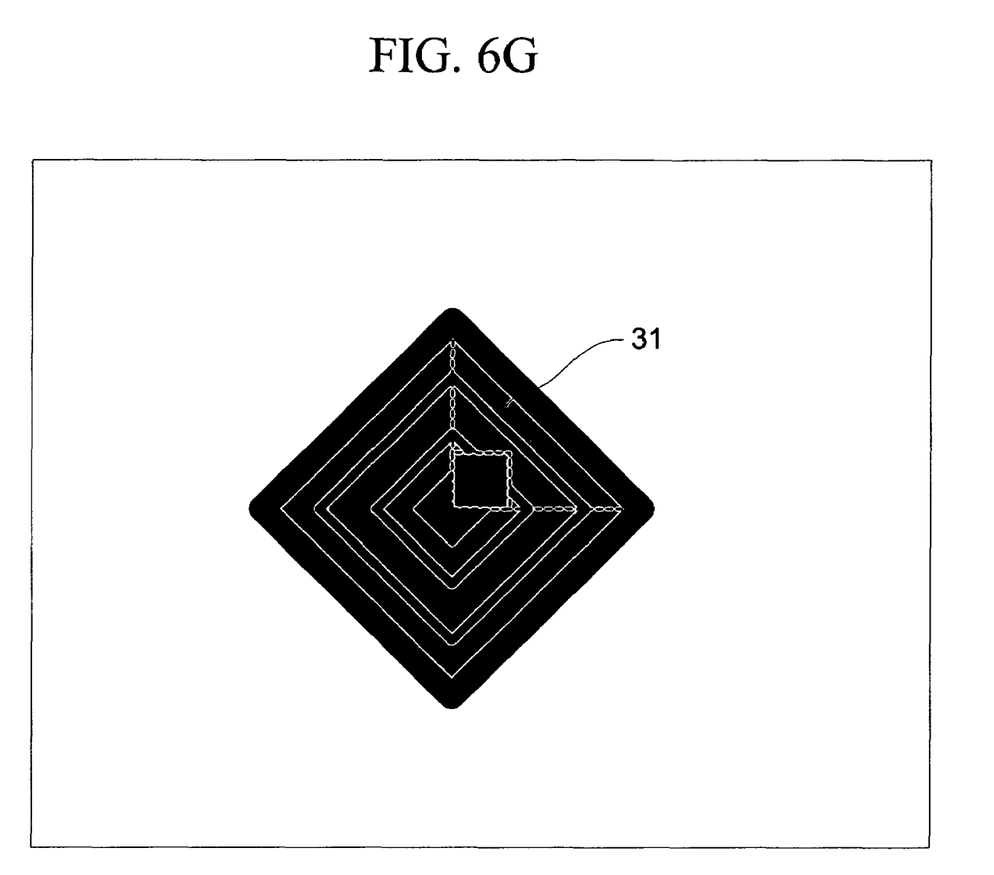

Also, the door 31 can be modified so as to change exposure amount of the background design both when the door 31 is opened or closed by changing a position of pivot edge of the door 31 or cutting edges of the door 31, as shown in FIG. 6G.

FIG. 7 shows drawings for illustrating the coloring book according to a third embodiment of the present invention.

Figure 7A:
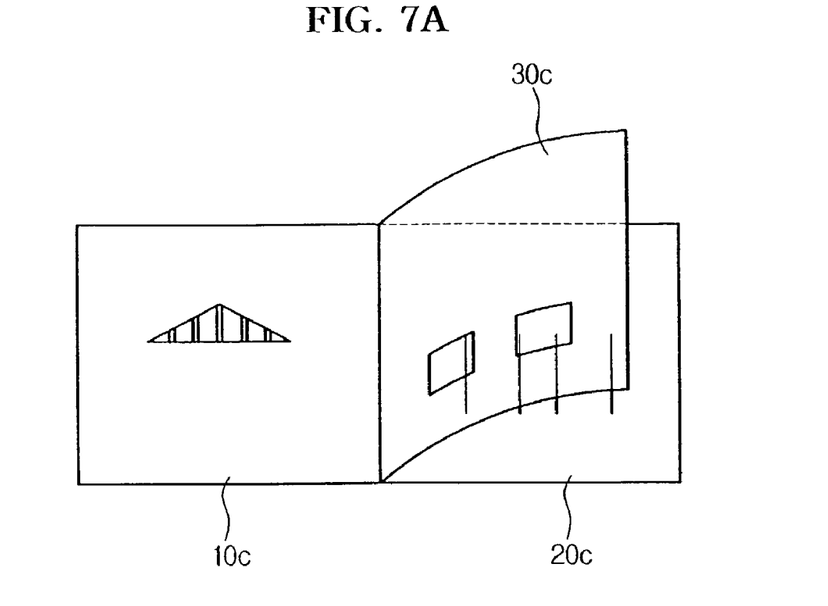
FIG. 7 shows drawings for illustrating the coloring book according to a third embodiment of the present invention.

As shown in FIG. 7a, a pair of squares is drawn as foreground design on a transparent sharing sheet 30c, a roof-like design is drawn on the first background sheet 10c, and four vertical lines are drawn on the second background sheet 20c.

Figure 7B:
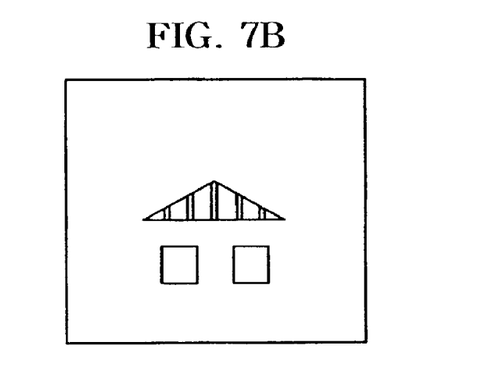

As shown in FIG. 7b, the foreground design on the sharing sheet 30c is coordinated with the background design on the first background sheet 10c when the sharing sheet 30c is folded with the first background sheet 10c so as to form a coordinated design.

Figure 7C:
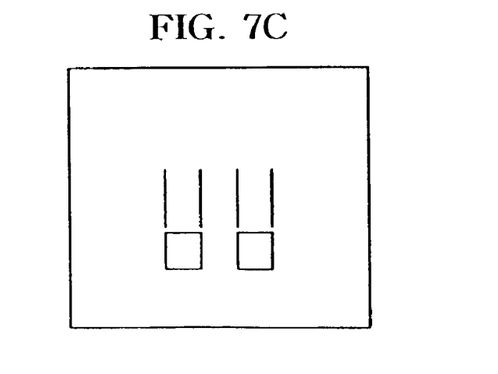
Figure 8A:
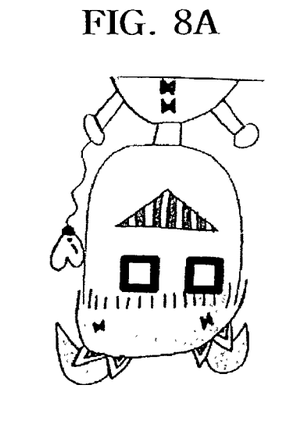
FIG. 8 shows exemplary drawings drawn using the designs on the background and shared sheets of the coloring book of FIG. 7.
Figure 8B:
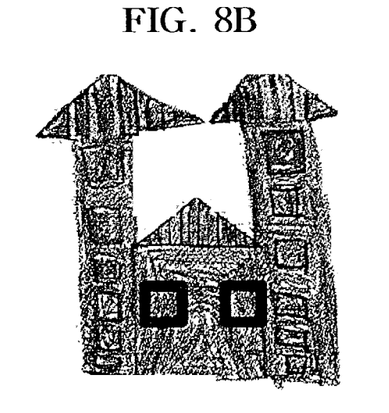
Figure 8C:
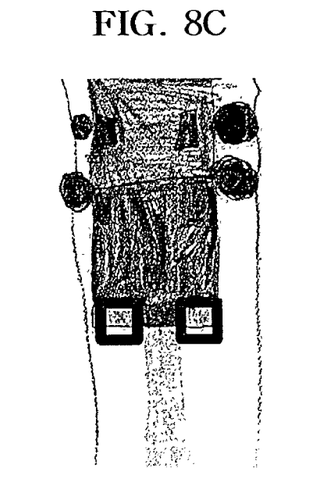
Figure 8D:
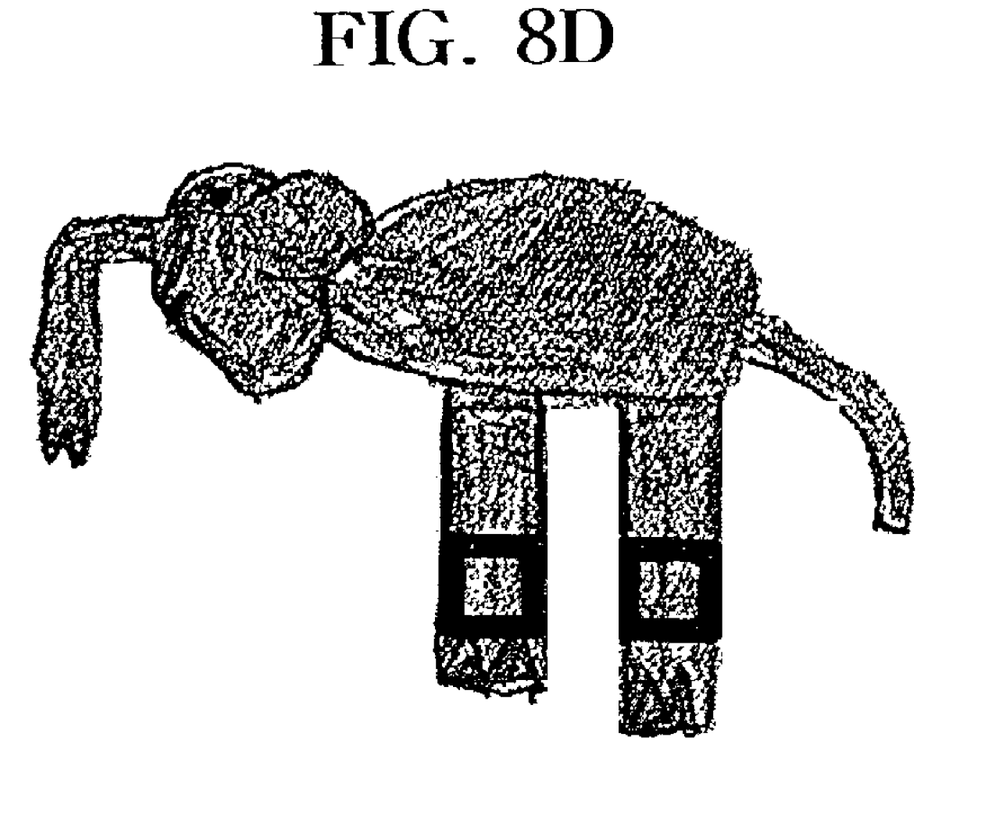

FIG. 7c shows a coordinated design when the foreground design 35 on the sharing sheet 30c is coordinated with the background design on the second background sheet 20c.

As shown in FIG. 7c, the foreground design on the sharing sheet 30c is coordinated with the background design on the second background sheet 20c when the sharing sheet 30c is folded with the second background sheet 20c so as to form a coordinated design.

FIG. 8 shows exemplary drawings drawn by babies on the basis of the coordinated designs of the FIG. 7b and FIG. 7c formed by folding the sharing sheet 30c with the first and second background sheets 10c and 20c.

It is shown that the same coordinated design suggests different images to babies' minds.

It is preferred that the basic designs sketched on the background sheets and the sharing sheet is systemically designed such that the coordinated designs stimulate the babies' imagination.

As described above, the page set of the coloring book according to the present invention consists of a pair of background sheets and a sharing sheet, which is transparent or has openings for exposing the background sheet therethrough when the sharing sheet is folded with each of the background sheets, such that basic designs drawn on the background sheets are coordinated with another basic design on the sharing sheet. Accordingly, the coordinated designs suggest something to the baby's mind and stimulate baby's imaginations such that the baby can draw images that he/she has imagine on the basis of the coordinated designs, resulting in development of the baby's image recognition, imagination, and creativity.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A coloring book having at least one page set, bound or stapled, wherein the page set comprises:
   a pair of background sheets, each having a different background design;
   a sharing sheet between the background sheets, the sharing sheet being coordinated with the background sheets, wherein the sharing sheet includes at least one aperture that exposes at least one of the background designs, the sharing sheet being blank or provided with at least one foreground design on at least one of a front surface and a rear surface-thereof and configured to provide a designated drawing space for creating a drawing in conjunction with the at least one background design; and
   at least one door provided by cutting a piece of the sharing sheet and leaving a portion attached, wherein the door is configured to open and close such that the foreground design on the sharing sheet coordinates with the background design on one of the background sheets in various manners when the sharing sheet is folded with each of the background sheets and the door of the sharing sheet has a shape different from a shape of the aperture, such that the background design is partially exposed when the door is closed.

2. A coloring book having at least one page set, bound or stapled, wherein the page set comprises:
   a pair of background sheets, each having a different background design;
   a sharing sheet between the background sheets, the sharing sheet comprising opaque paper and being coordinated with the background sheets, wherein the sharing sheet includes at least one aperture that exposes at least one of the background designs, the sharing sheet being blank or provided with at least one foreground design on at least one of a front surface and a rear surface and configured to provide a designated drawing space for creating a drawing in conjunction with the at least one background design; and
   at least one door provided by cutting a piece of the sharing sheet and leaving a portion attached, wherein the door is configured to open and close such that the foreground design on the sharing sheet coordinates with the background design on one of the background sheets in various manners when the sharing sheet is folded with each of the background sheets and the door of the sharing sheet has a shape different from a shape of the aperture, such that the background design is partially exposed when the door is closed.

* * * * *